Dec. 28, 1965  F. J. FUCHS, JR., ETAL  3,225,689
COMBINED FEEDING AND MARKING APPARATUS
Filed Nov. 13, 1963  2 Sheets-Sheet 2
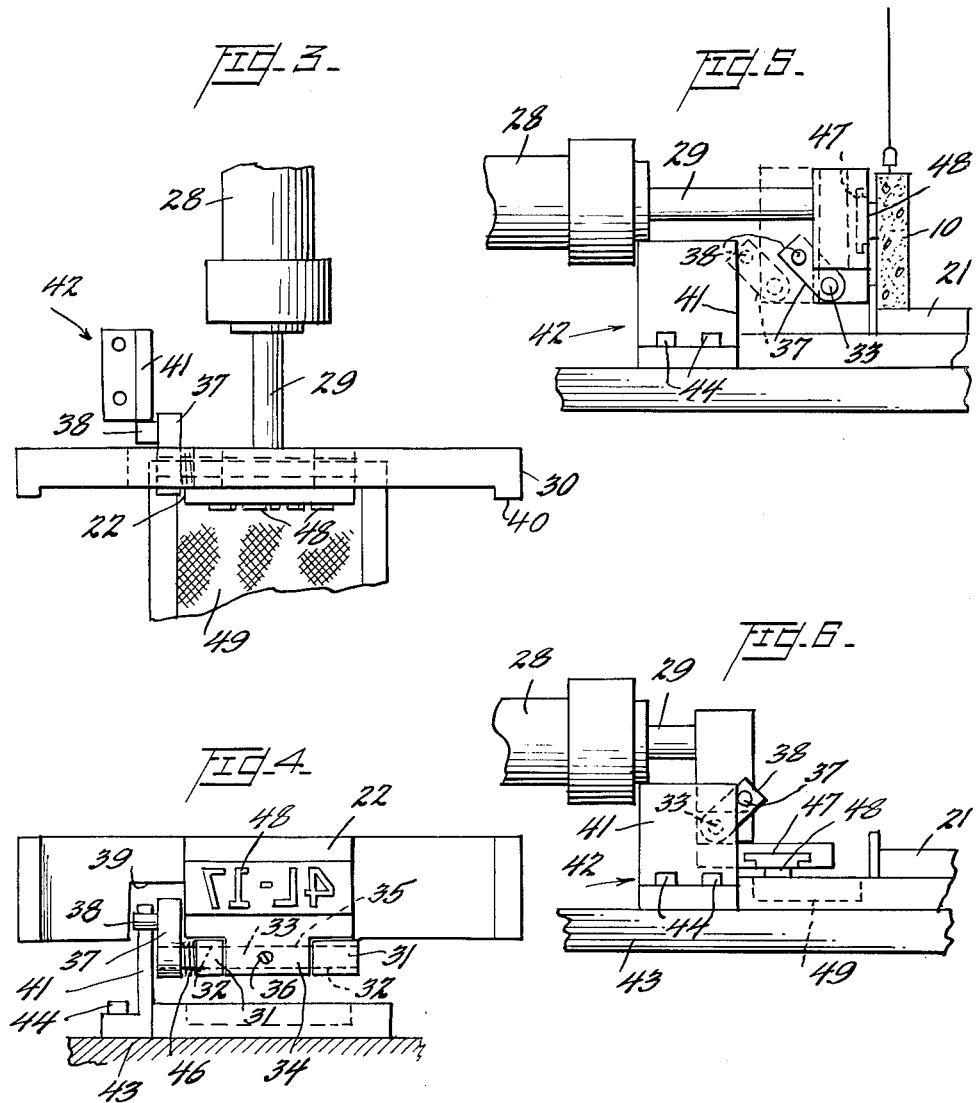

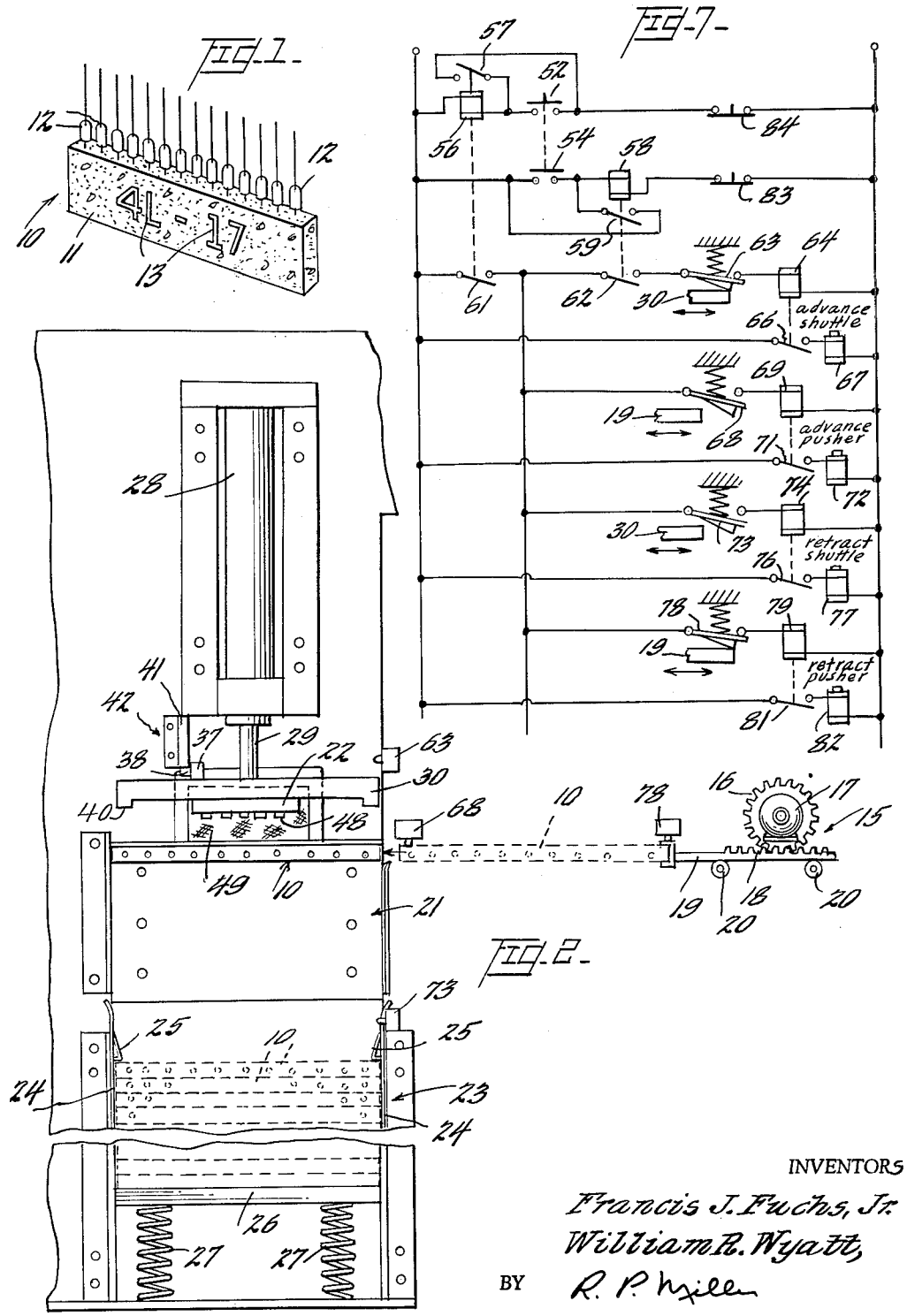

_United States Patent Office_  3,225,689
Patented Dec. 28, 1965

3,225,689
COMBINED FEEDING AND MARKING APPARATUS
Francis J. Fuchs, Jr., Princeton Junction, N.J., and William R. Wyatt, Greenville, S.C., assignors to Western Electric Company, Incorporated, New York, N.Y., a corporation of New York
Filed Nov. 13, 1963, Ser. No. 323,400
1 Claim. (Cl. 101—44)

This invention relates to a combined feeding and marking apparatus and, more particularly, to such apparatus that may be utilized to simultaneously feed an article and mark indicia on the article with one movement of a feeding and marking plate.

In the prior art, it has been customary to perform the feeding and marking operation in two separate steps. This entailed the use of a first powered device to feed the article, and a second powered device to mark the article. By combining the operations into one step, only one power source is necessary. There is also a comparable reduction in associated equipment such as guiding devices, stopping means, and other handling equipment.

It is an object of the present invention to provide a new and improved feeding and marking device for acting on articles.

It is another object of the invention to provide a reciprocating pusher member having indicia on the forward face thereof to feed and to mark articles simultaneously.

It is still a further object of the invention to provide a reciprocating pusher plate, which on the forward stroke, will feed and mark the article and on the return stroke, is cammed into contact with a reservoir of marking material.

It is another object of the invention to provide a feeding and marking plate, the movement of which is responsive to a shuttle for positioning an article in register with the marking plate.

With these and other objects in mind, the present invention contemplates a pusher plate having marking facilities on the face thereof for feeding and marking an article. A reciprocable shuttle is provided to sequentially position articles in register with the pusher plate. As each article is so positioned, the pusher plate is reciprocated so that on the forward stroke the article is pushed and fed into a storage rack while indicia is marked on a face of the article. On the return stroke of the pusher plate, the marking facilities are cammed downwardly into contact with an ink pad or some other similar supply source of marking material. The shuttle is retracted to receive another article which is then fed into register with the pusher plate to initiate another cycle of operation.

Other objects and advantages of the invention will become apparent upon consideration of the following detailed description in conjunction with the accompanying drawings, in which:

FIG. 1 is a perspective view of a foam plastic block which has electrical components such as diodes projecting therefrom that may be fed and marked by the apparatus of the present invention;

FIG. 2 is a plan view of an apparatus embodying the principal features of the present invention for initially positioning a foam plastic block in register with a plate which marks and feeds the foam plastic blocks into a rack;

FIG. 3 is a plan view of the pusher plate in a partially retracted position;

FIG. 4 is a front view of the pusher plate illustrating the marking facilities and a crank arm for pivoting the pusher plate;

FIG. 5 is a side view of the pusher plate in contact with a foam plastic block and which in the phantom view illustrates the engagement of the pusher plate with a camming surface;

FIG. 6 is a side view illustrating the marking facilities of the pusher plate pivoted into contact with a reservoir of marking material; and FIG. 7 is a circuit diagram illustrating control facilities for the apparatus shown in the other figures.

Referring to the drawings and in particular to FIG. 1, there is shown an article 10 which comprises a penetrable foam plastic block 11, such as that sold under the trade-mark "Styrofoam," having electrical components such as diodes 12 mounted therein. On the face of the foam plastic block are printed indicia 13 to identify the article. Foam plastic blocks of this type may be fed and marked by the apparatus comprising the instant invention although it is to be understood that this block is only an example and that other articles may be fed and marked by the apparatus.

Referring to FIG. 2, there is shown an article positioning mechanism 15 comprising a pinion 16 mounted for rotation in a horizontal plane and driven by a rotary air motor 17. Pinion 16 is in engagement with a rack 18 having a shuttle 19 mounted on one end thereof. Rack 18 and shuttle 19 are guided by rollers 20 for linear, reciprocating movement. Any conventional means such as a chute, conveyor, etc. (not shown) may be provided to supply or advance loaded blocks 11 to shuttle 19 prior to each reciprocation. On each forward advance of shuttle 19 a block 11 is moved onto a shelf 21 and into register with a printing member or pusher plate 22. Aligned with pusher plate 22 is a receiving or storage rack 23 having guide rails 24. Mounted on guide rails 24 are retaining springs 25. A follower 26 biased by springs 27 is slidably mounted between guide rails 24.

Referring now to FIGS. 3 and 4, there is shown an air cylinder 28 having a piston rod 29 to which is attached a support plate 30. The support plate 30 has a front face with two lugs 40 extending from opposite ends thereof to prevent lateral movement of the block 11 during feeding. Support plate 30 is provided with two depending bosses 31 having transverse bores 32 in which a supporting shaft 33 is freely mounted. The lower portion of pusher plate 22 is formed as a projection having a right angle flange portion 34 which has a transverse bore 35. The flange portion 34 is positioned between bosses 31 with the transverse bores 32 and 35 axially aligned. The flange portion 34 is secured to shaft 33, which passes through transverse bore 35, by a set screw 36.

Fixedly mounted on one end of shaft 33 is a crank arm 37 having a camming pin 38 secured thereto. Positioned in horizontal alignment with camming pin 38 is an opening 39 in support plate 30 and an upstanding cam 41 of a stationary cam plate 42 which is secured to a base member 43 by bolts 44. Pusher plate 22 is normally held in engagement with support plate 30 by a torsion spring 46 mounted about shaft 33 and secured at its ends to crank arm 37 and support plate 30. Pusher plate 22 is further provided with a transverse keyway 47 (FIG. 5) to receive type 48 which protrudes beyond the face of the plate and slightly beyond the extending lugs 40. Mounted beneath plate 22 on base 43 is an ink pad 49.

Considering the operation of the mechanical elements and referring particularly to FIGS. 2, 5, and 6 there is shown a foam plastic block 11 containing diodes 12 supported on the shelf 21. The shuttle 19 has positioned a block 11 in register with plate 22. Air cylinder 28 moves pusher plate 22 (solid lines FIG. 5) forward whereupon type 48 contacts and pusher block 11 onto the rack 23 (FIG. 2) past the retaining springs 25 and against the force of springs 27 which bias follower 26. If the block 11 laterally pivots about the type 48 during feeding, the lugs 40 contact the ends of the block 11 and prevent further lateral movement so that the block 11 is properly aligned with the type 48 and the rack 23. As block 11 is fed onto storage rack 23 against follower 26, the type 48 presses more firmly against the block to print indicia 13 thereon. As plate 22 is retracted (dashed lines FIG. 5), the pin 38 of crank arm 37 engages the cam 41 pivoting crank arm 37, pusher plate 22, and type 48 clockwise until the type 48 is in contact with the ink pad 49 (FIG. 6). At this point the piston rod 29 of air cylinder 28 is in the fully retracted position. As piston rod 28 starts another forward stroke to engage a subsequent foam plastic block, torsion spring 46 returns pusher plate 22 to its vertical position against support plate 30 and in register with the next block 11.

Attention is now directed to FIG. 7 showing a circuit for controlling the operation of the apparatus. Initially, it will be assumed that a first foam plastic block 11 is positioned in shuttle 19 ready for advancement. It is further assumed that air pressure is available to operate air cylinder 28 and rotary air motor 17.

In order to initiate cyclic operation of the apparatus, a start button 52 having two sets of contacts 53 and 54 is depressed to complete a circuit to energize a relay 56 which draws up a contact 57 to complete a locking circuit about the start button 52. At the same time a circuit is completed to energize a relay 58 which draws up a contact 59 to complete a locking circuit about the contact 54 of start button 52. Energization of relays 56 and 58 also draws up contacts 61 and 62, respectively, which completes a circuit through a now closed limit switch 63 to energize a relay 64. Limit switch 63 (see FIG. 2) is located to be closed by the support plate 30 in the retracted position. Likewise with shuttle 19 in a retracted position a limit switch 78 is closed. Energization of relay 64 draws up a contact 66 to complete a circuit to a shuttle forward solenoid 67 that functions to control the application of air to the rotary air motor 17. Rotary air motor 17 rotates pinion 16 to advance rack 18 and shuttle 19 with a foam plastic block 11. As shuttle 19 advances, the limit switch 78 is opened and a relay 79 is deenergized opening a contact 81 breaking the circuit to a pusher retract solenoid 82.

When shuttle 19 reaches its forward position, with a foam plastic block 11 on shelf 21, a limit switch 68 is closed energizing a relay 69 which draws up a contact 71. Closure of contact 71 completes a circuit to a pusher forward solenoid 72 that functions to control the application of air to cylinder 28 to advance the support plate 30 and pusher plate 22 forward to print a marking on the block and push the block from shelf 21 into storage rack 23. As plates 22 and 30 start forward, limit switch 63, which is normally held in the closed position by support plate 30, is opened and relay 64 is deenergized opening contact 66 breaking the circuit to shuttle forward solenoid 67.

When plates 22 and 30 reach the forward position, a limit switch 73 (see FIGS. 2 and 7) is closed by support plate 30 to complete a circuit to energize a relay 74 which draws up a contact 76. Closure of contact 76 completes a circuit to a shuttle retract solenoid 77 which functions to reverse the application of air to the rotary air motor 17. Rotary air motor 17 now rotates pinion gear 16 in a reverse direction to retract shuttle 19 into position to receive another block. As shuttle 19 is retracted, limit switch 68 is opened and relay 69 is deenergized opening contact 71 breaking the circuit to pusher forward solenoid 72.

When shuttle 19 is fully retracted, the limit switch 78 is closed to complete a circuit to energize the relay 79 which draws up the contact 81. Closure of contact 81 completes a circuit to pusher retract solenoid 82 which functions to reverse the application of air to cylinder 28 whereupon support plate 30 and pusher plate 22 commence to retract. As support plate 30 retracts, limit switch 73 is opened and relay 74 is deenergized opening contact 76 breaking the circuit to retract shuttle solenoid 77. As support plate 30 is retracted, camming pin 38 engages the cam 41 to pivot the pusher plate 22 downwardly into contact with ink pad 49. When support plate 30 reaches the retracted position, limit switch 63 is closed and the cycle repeats.

In order to stop the operation under normal conditions, cycle stop button 83 may be depressed to deenergize relay 58 opening contacts 59 and 62. Since contact 61 is still drawn up, the apparatus will continue to cycle until both the shuttle 19 and support plate 30 are retracted at which time the open circuit through contact 62 to relay 64 will cause stoppage of the cycle. If it is desired to stop the operation immediately, an emergency stop button 84 may be depressed which deenergizes relay 56 opening contacts 57 and 61 which deenergizes relays 64, 69, 74, and 79.

It is to be understood that the above-described arrangements of apparatus and construction of elemental parts are simply illustrative of the application of the principles of the invention and many other modifications may be made without departing from the invention.

What is claimed is:

In a device for marking and feeding an article,
a support plate having a front face,
a printing member pivotally mounted on said support plate for movement toward and away from the front face of said plate,
type mounted on and projecting from said printing member,
means for resiliently holding said printing member against the face of said support plate,
a storage rack in alignment with said printing member for receiving an article,
a follower mounted within said rack for engaging an article fed into said rack,
spring means mounted on the sides of said rack for retaining said article against said follower,
means for advancing an article between said printing member and said rack,
means actuated by the advancing means for moving the support plate and printing member to advance the type into engagement with said article to feed said article past said spring means and into said rack against said follower,
resilient means acting against said follower for opposing the movement of the article into said rack whereby said type moves into firmer engagement with said article,
lugs extending from opposite ends of the front face of said support plate a distance less than the distance that the type projects from said support plate for restraining said article from lateral movement during feeding, means responsive to the feeding of said article into said rack for reversing the movement of said plate and printing member, means positioned in the path of movement of the printing member for engaging and pivoting said printing member against said resilient means and away from the face of the support plate, and an ink pad positioned in the path of pivotal movement of the type on said printing member.

References Cited by the Examiner

UNITED STATES PATENTS

| | | | |
|---|---|---|---|
| 595,866 | 12/1897 | Sullivan | 101—44 X |
| 1,992,037 | 2/1935 | Mulder | 101—35 X |
| 3,115,826 | 12/1963 | Reinhardt et al. | 101—334 X |

ROBERT E. PULFREY, *Primary Examiner.*

WILLIAM B. PENN, *Examiner.*